United States Patent [19]

Gauthier

[11] Patent Number: 4,741,123
[45] Date of Patent: May 3, 1988

[54] GREENHOUSE

[76] Inventor: Jean Gauthier, 14, rue Saint-Louis, Loretteville, Province of Quebec, Canada, G2B 1J9

[21] Appl. No.: 944,812

[22] Filed: Dec. 12, 1986

[51] Int. Cl.$^4$ ............................................. A01G 9/00
[52] U.S. Cl. ............................................. 47/17; 47/27
[58] Field of Search ............... 202/234; 203/DIG. 1; 126/417, 428, 430, 436; 52/80, 81, 86, 202; 47/17, 26, 27, 28 R, 65, 62, 19

[56] References Cited

U.S. PATENT DOCUMENTS

| | | | |
|---|---|---|---|
| 3,315,409 | 4/1967 | Poulin . | |
| 3,909,992 | 10/1975 | Stachiw | 52/80 |
| 3,970,525 | 7/1976 | Kurek | 202/187 X |
| 4,125,963 | 11/1978 | Johnson . | |
| 4,316,347 | 2/1982 | Smith | 47/17 |
| 4,567,690 | 2/1986 | Murrell | 47/17 |
| 4,597,272 | 7/1986 | Marr | 47/17 |

FOREIGN PATENT DOCUMENTS

| | | | |
|---|---|---|---|
| 694252 | 9/1964 | Canada | 47/17 |
| 759932 | 10/1956 | United Kingdom . | |
| 1148970 | 4/1969 | United Kingdom | 47/17 |

*Primary Examiner*—Robert A. Hafer
*Assistant Examiner*—Danton D. DeMille

[57] ABSTRACT

A greenhouse for growing plants in desertic areas, including a watering system for recuperating condensate water from morning and evening dews and feeding this collected water to the plants.

25 Claims, 4 Drawing Sheets

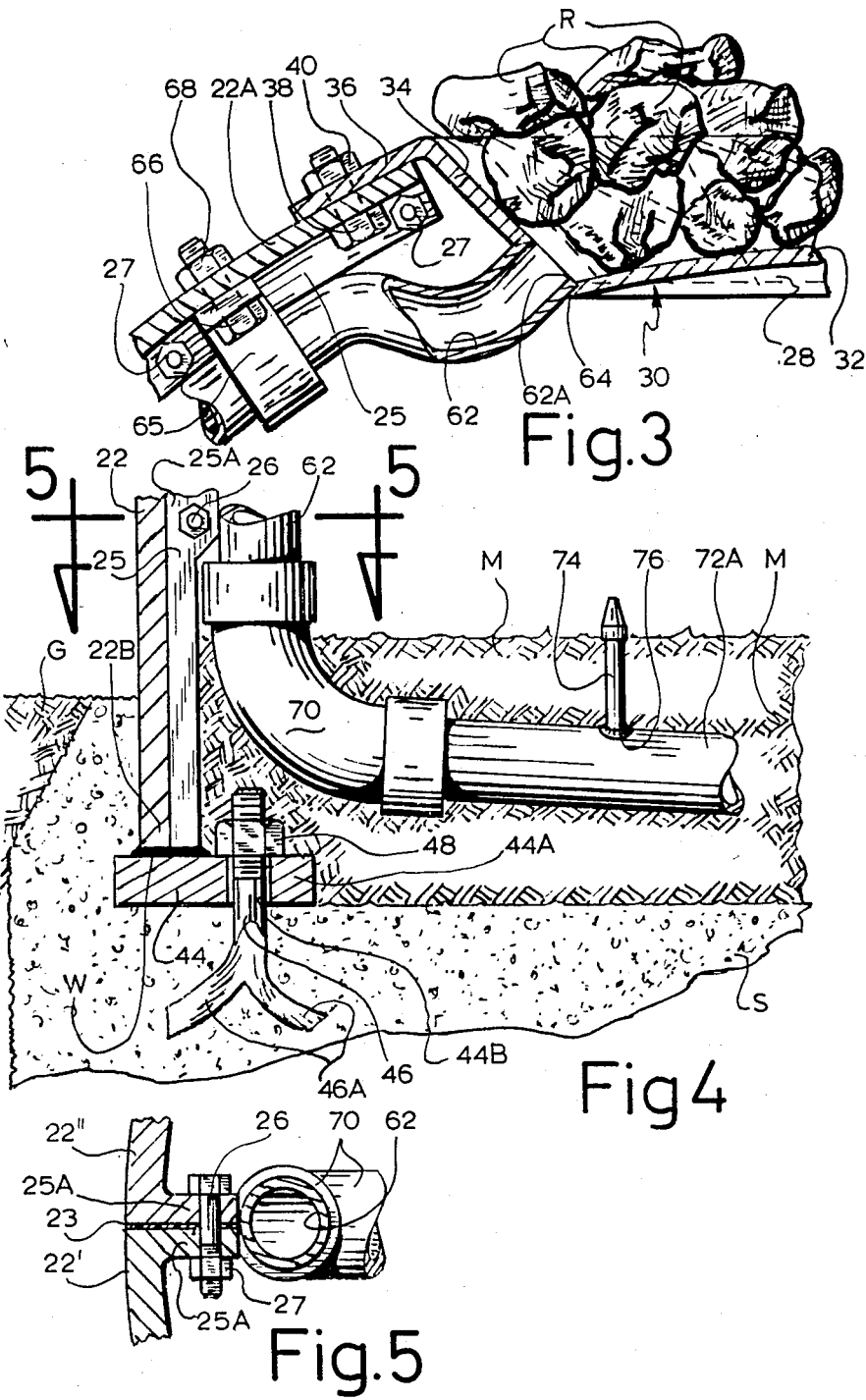

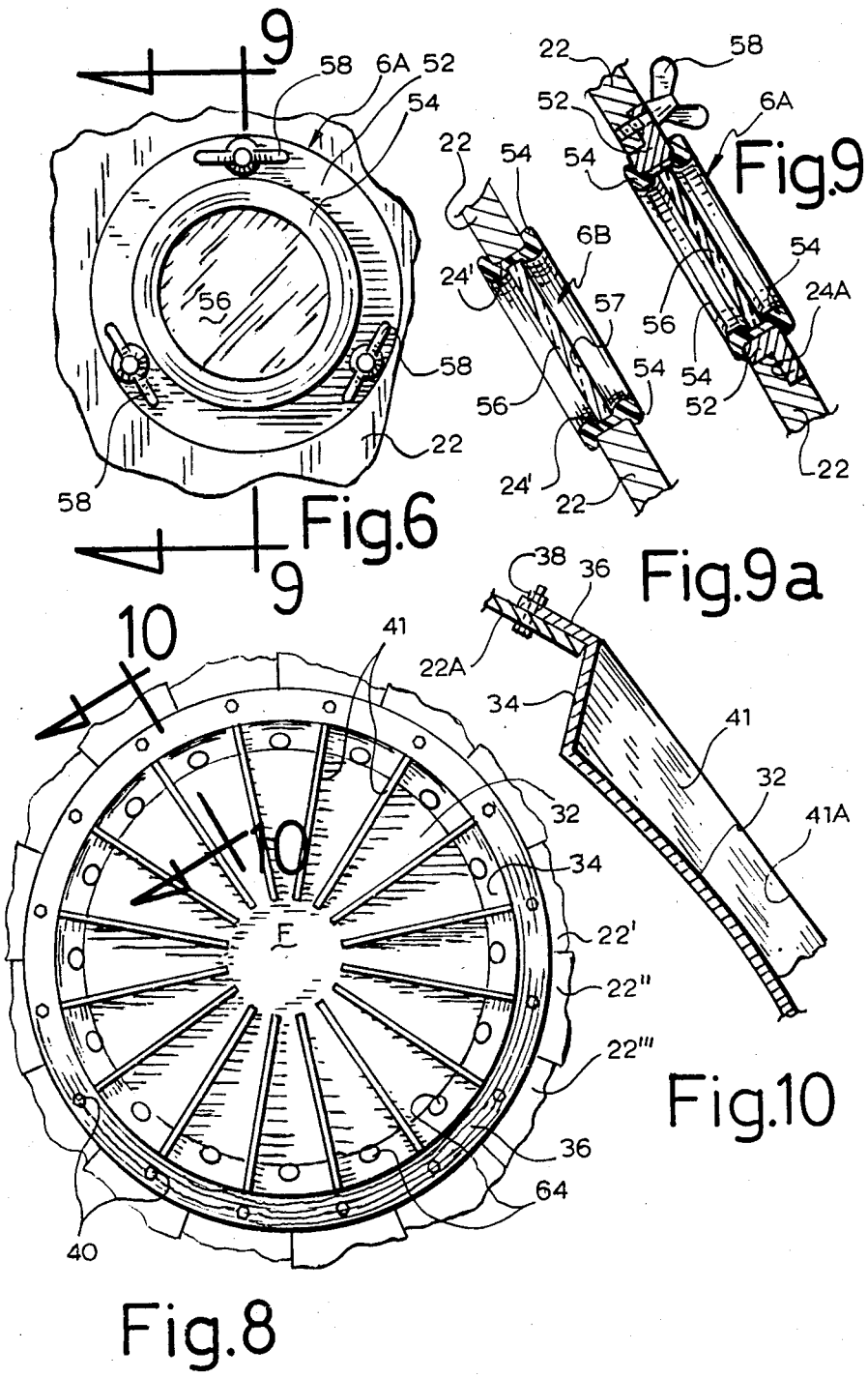

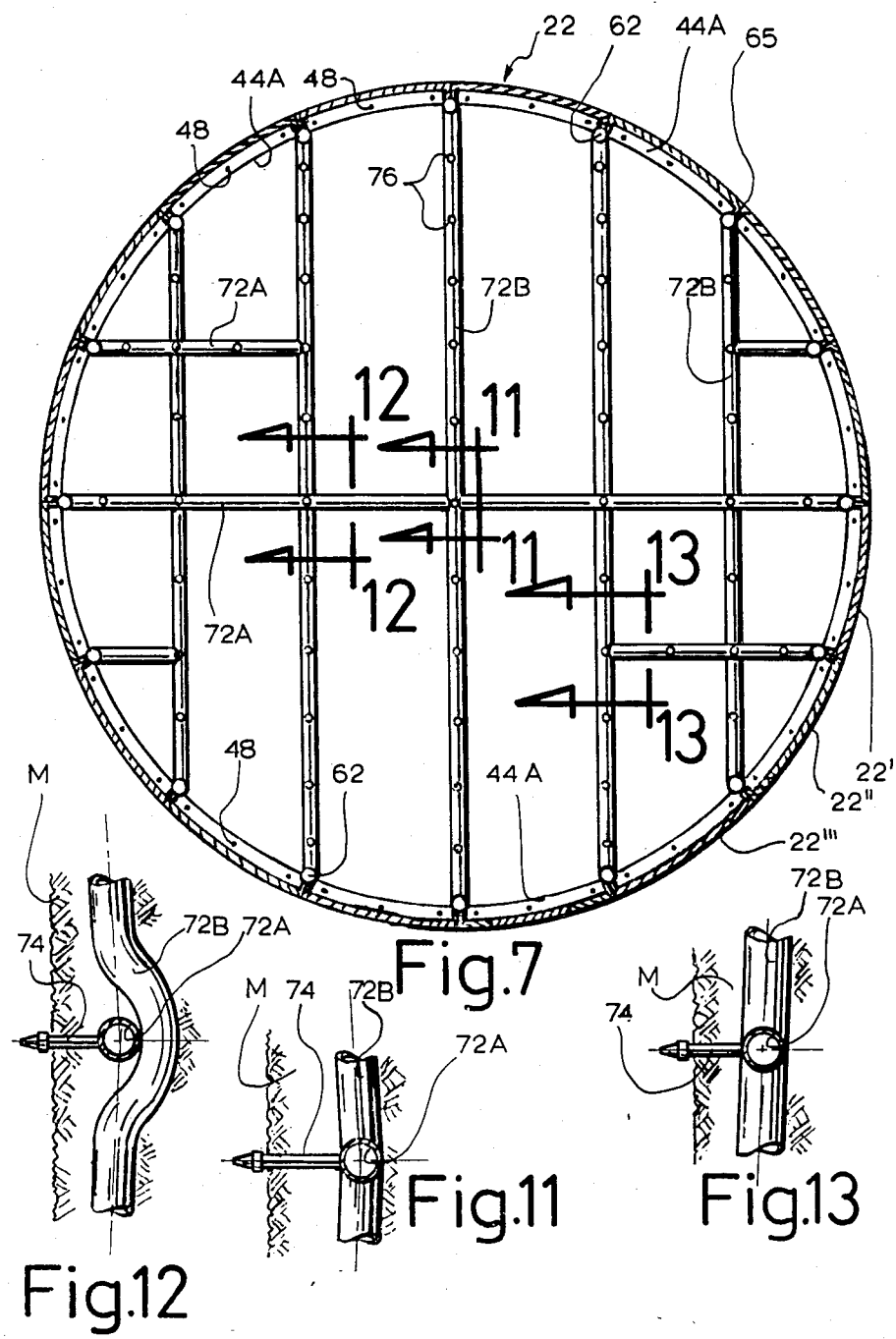

GREENHOUSE

FIELD OF THE INVENTION

This invention relates to greenhouses for growing plants and, more specifically, to a greenhouse designed for desertic or semi-arid countries.

BACKGROUND OF THE INVENTION

Conventional greenhouses consist of ground-standing transparent shell buildings designed for inter alia growing plants in unfavorable weather conditions, while still providing natural light to the plants. These simple greenhouses are acceptable in countries where the climate is normally mild and temperatures moderate; however, they are unsatisfactory in harsher climates, because of temperature control problems, light intensity and, most importantly, control of evaporation/watering of the plants. Of course, one can build opaque, insulated greenhouses to eliminate these problems, where light must be artificially produced; but then, the cost factor becomes a major consideration.

In the prior art, improved greenhouses have been proposed, to counter at least some of the above problems. For exemple, in U.S. Pat. No. 3,315,409, issued in 1967 to Poulin, there is disclosed a greenhouse for growing plants, including two semi-spherical transparent shells 1-2 and a well 4 at the apex thereof. The well 4 is provided with float valves 3, closing circular perforations 4.31 pierced therein. Water deposited by rain in the wall 4 is admitted into the greenhouse when the water level rises sufficiently in the well to buoy the float valves 3, so as to water plants therebelow. It also includes heat evacuation means 5, about well 4.

This watering means 3-4 of Poulin is operative only in areas where rainfalls are substantial and occur regularly and, accordingly, would not be suitable for desertic regions where rainfalls are extremely scarce. Moreover, because the shells 1-2 are both transparent, the plants grown in the greenhouse will have to be limited in their variety, since a great number of plant species cannot withstand the high level of illumination and/or heat (not-withstanding heat evacuation means 5, which does not induce air circulation in the greenhouse) generated by sunrays in desertic countries.

None of the known prior art greenhouses meet the challenge of being adapted to grow plants in desertic or at least semi-arid regions.

OBJECTS OF THE INVENTION

The gist of the present invention is to provide a greenhouse specifically adapted for growing plants in desertic or semi-arid regions.

An important object of the above invention is to provide a watering system for such a greenhouse which operates solely by recuperation of morning and evening dew.

Another object of the invention is that the above watering system be automatically operated without the need for pumping means.

Another important object of the invention is to provide means to control illuminating levels in the greenhouse.

Still another object of the invention is to provide means for automatically controlling the temperature within the greenhouse.

A further object of the invention is the simplicity and economy of manufacture of the greenhouse.

SUMMARY OF THE INVENTION

In a greenhouse for growing plants in desertic or semi-desertic climates, a dome-shaped rigid opaque shell adapted to stand on the ground, a plurality of windows mounted into apertures in said shell and each defining a transparent pane, an opening at the apex of said shell; a rigid container closing said opening and fixedly secured to said shell, said container defining a flooring and an upwardly-inclined circular side wall, said container adapted to receive a load of impervious rocks; a shell door for access to said greenhouse; collecting means to recuperate condensate water on said rocks from morning and evening dews; and distribution means for watering said plants with the water recuperated from dew by said collecting means.

BRIEF DESCRIPTION OF THE DRAWINGS

FIG. 3 is an enlarged view of the section within the area in circle 3 of FIG. 2;

FIG. 4 is an enlarged view of the section within the area in circle 4 of FIG. 2;

FIG. 5 is a sectional view taken along line 5—5 of FIG. 4;

FIG. 6 is an enlarged plan view of the exterior face of a first embodiment of porthole, with its associated greenhouse main wall portion;

FIG. 7, on the fourth sheet of drawings, is a horizontal sectional view on a slightly-enlarged scale, of the greenhouse, taken along line 7—7 of FIG. 1;

FIG. 8, on the third sheet of drawings, is a horizontal sectional view, on an enlarged scale, of the greenhouse top well, taken along line 8—8 of FIG. 1, but with the rocks removed;

FIG. 9 is a sectional view of the first embodiment of porthole, taken along line 9—9 of FIG. 6;

FIG. 9a, on the second sheet of drawings, is the view of FIG. 9 but for a second embodiment of porthole;

FIG. 10 is a sectional view, on an enlarged scale, of the top well, taken along line 10—10 of FIG. 8; and FIGS. 11 to 13 are enlarged sectional views of the greenhouse bottom water circulating tubes, taken along lines 11—11, 12—12, and 13—13, respectively, of FIG. 7, and on an enlarged scale relative thereto.

DETAILED DESCRIPTION OF THE INVENTION

Figure 1:
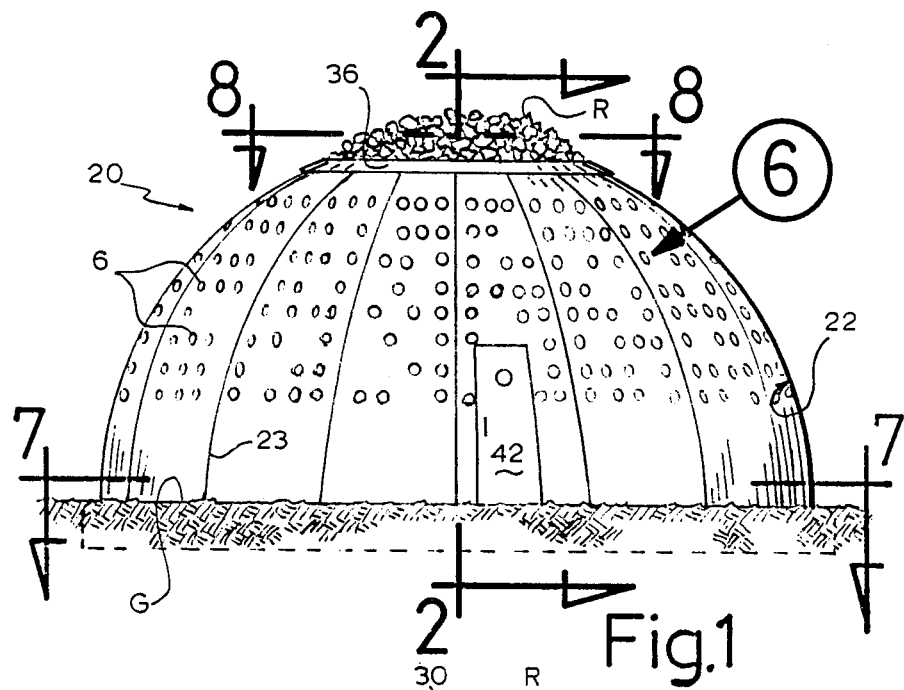
FIG. 1 is a front elevation of a greenhouse according to a preferred embodiment of the invention and showing the trench in the ground in dotted lines.
Figure 2:
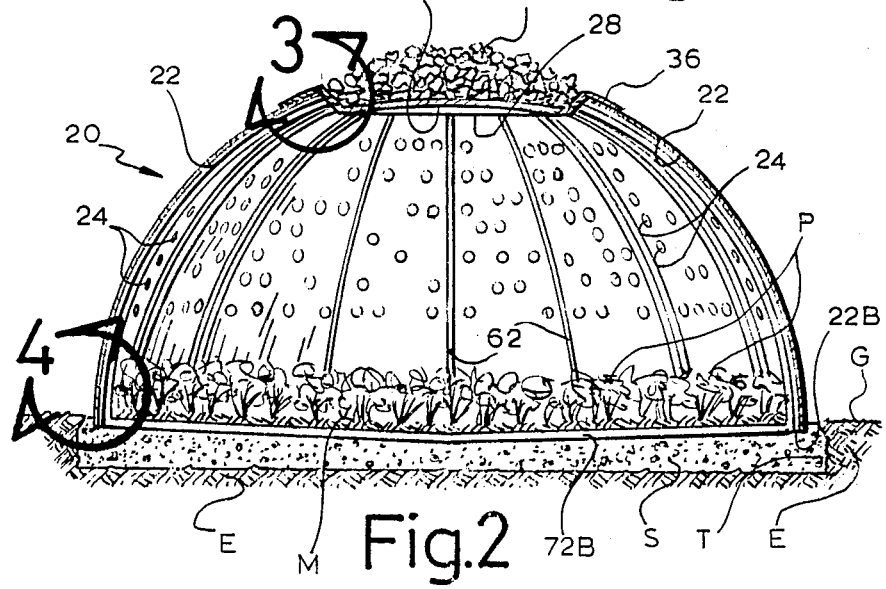
FIG. 2 is a sectional elevation of the greenhouse taken along line 2—2 of FIG. 1.

As shown in FIGS. 1-4 and 10, greenhouse 20 consists of a substantially semi-spherical shell 22, pierced by a plurality of circular apertures 24, each aperture 24 being closed by a circular window or porthole 6. The shell 22 is sturdy, rigid and opaque, and preferably, molded from glass fiber-reinforced resin. Shell 22 is made of a number of successive sectors 22′, 22″, 22‴, see FIGS. 5, 7, which define inturned flanges 25 at their side edges. Enlarged portions 25A of the flanges 25 are fixedly interconnected in pairs by a plurality of spaced rust-proof bolts 26 and locking nuts 27. A sealing strip 23 separates each pair of adjacent flanges 25A. Each porthole 6 is closed by a transparent rigid sheet, preferably from a plastic material. The apex portion of the shell 22 defines a large circular opening 28. A dish-shaped container 30 is mounted into this opening 28. Container 30, made also of glass fiber-reinforced resin, includes a central floor 32, of concavo-convex shape with the convex side on the exterior. Container 30 also defines an annular side wall 34, which is upwardly outwardly inclined, and a peripheral annular flange 36, which is downwardly inwardly inclined. Walls 32, 34, 36 are each about the same thickness as shell 22. Flange 36 conforms to the shape of, and is fixedly secured to, the outer face of the top annular portion 22A of shell 22 by a plurality of rust-proof bolts 38 and nuts 40. The radius of curvature of the concavo-convex dish flooring 32 is slightly greater than that of the adjacent shell portion 22A. Also, a plurality of radially-extending, spaced partition walls 41, see FIG. 8, are mounted on the exterior face of flooring 32, to define a plurality of compartments therebetween for equal distribution therein of medium-sized rocks R, for a purpose later set forth. The top edge of partitions 41, at 41A, is straight and connects one flange portion 36. The radially-inward ends of partitions 41 extend short of one another, defining a central free space F, also adapted to receive rocks R.

Greenhouse 20 is designed to stand on the ground G. More particularly, earth E is dug from the ground for about a meter or so in depth and for an area slightly larger than the diameter of the greenhouse, to constitute a trench T. Gravel and/or sand S is poured into the trench T, up to the ground level G. The circular bottom end 22B of shell 22 is thereafter engaged into the gravel/sand base S, down to slightly below the ground level G. Less than a meter thick of peat moss M is then added above base S, within the shell bottom end 22B, and is designed to constitute both a substrate and a nutrient supply for plants P. The lowermost layer of windows 6 should be at the least about one meter above the ground level G, as illustrated, i.e. above the top of the grown plants P, for allowing sun-rays to illuminate and heat same. A door 42 is also provided at a lower portion of shell 22 for access to the inside of the greenhouse. Door 42 may include hinges, a knob and locking bars, not shown.

A large annular plate 44 is welded at W to the shell bottom end 22B. Plate 44 projects radially inwardly of shell 22, at 44A, and includes a number of bores 44B for loose engagement by bolts 46 locked in place by top nuts 48. Bolts 46 define a Y-shaped outer bottom end portion 46A, engaging into the gravel/sand base S to therefore constitute anchoring means of the shell 22 into the gravel/sand base.

Windows 6 are of either of two types. A small number of them look like the embodiment shown in FIGS. 6 and 9, and will be more particularly denoted 6A. Each window 6A defines a peripheral annular frame 52, an intermediate annular sash 54 of dumbbell-shaped cross-section, and a circular transparent plastic pane 56. Sash 54 is made of elastomeric sealing material, such as rubber.

Rigid frame 52 is of cross-sectionally L-shape, which mates with a correspondingly-shaped peripheral contour of aperture 24. Each aperture 24 thus defines an inner radially-enlarged aperture portion 24A. The frame 52 is releasably locked to shell 22 by a few in-turned wing-headed bolts 58. Windows 6A can be removed by unscrewing bolts 58 for ventilating the greenhouse 20.

The second embodiment of windows 6, at 6B, which make up the bulk of windows 6, is shown in FIG. 9a.

The difference between portholes 6A and 6B is that the latter type is permanently fixed to shell 22. Therefore, there is no need for wing-headed bolts 58 and for the window frame 52, whereby the corresponding window aperture 24' is of uniform diameter and sealing sash 54 directly engages aperture 24'.

The sun moving relative to the greenhouse, each given plant will be illuminated only for a limited time period, since the light rays must pass through the few registering relatively small windows 6, which are only temporarily axially registering with the sun rays.

Reference is now made to the watering system shown more specifically in FIGS. 3, 4, 7, and 11-13. A number of flexible tubes 62 are frictionally mounted at their top ends 62A within spaced bores 64, which are successively extending along the bottom end portion of side wall 34 of dish 30. Tubes 62 run downwardly against the interior face of shell 22, and each is secured thereto at spaced intervals by U-bands 65, which are fixed to shell 22 by bolts 66 and nuts 68. The lower end of each tube 62 sealingly engages a diametrally larger elbow coupler 70, the latter embedded in part into peat moss M. An array of horizontal tubes 72A, 72B, at right angle with one another, extend through peat moss M, each end of each of which sealingly engages in the end of elbow coupler 70. A number of upright nozzles 74 are welded, or otherwise secured at 76, at spaced intervals to horizontal tubes 72A, 72B, projecting outwardly from peat moss M amongst plants P. Tubes 72A–B are preferably all inclined downwardly toward the center of dome-shaped shell 22, whereby each such tube forms a flat V.

The number of watering tubes 72A, 72B is not critical, although FIG. 7 shows five full-length front-to-rear-extending such tubes, but only one full-length and two segmented transversely-extending such tubes (for clarity of the view). It is understood that any number of full-length and/or segmented tubes 72A, 72B is envisioned in accordance with corresponding number of upwardly-extending tubes 62. Also, a given tube 72A or 72B may pass under the corresponding tube 72B or 72A, respectively, provided the one carrying the nozzle 74 at that specific section is the upwardly-positioned one, see FIG. 12 (both tubes 72A, 72B, carry nozzles 74); or alternately, as seen in FIGS. 11 and 13, tubes 72A, 72B may interconnect at their intersection.

The invention is fully operating at sunrise and sunset and, more particularly, at morning and evening dews, when variations of temperature for a given time period is highest, i.e. $dT/dt = $ maximum with T for temperature and t for time. Any substrate surface subjected to high variations of temperature is concurrently submitted to condensation, as is well known. Condensation about the surface of rocks R (which should be of the impervious type) in well 30 will be prevalent, for at least a short duration, thereby generating some water. The water will drip on the flooring 32, and will flow along the convex surface thereof down to its periphery, and thereafter, will flow by gravity into collecting tubes 62 and into bottom horizontal tubes 72A, 72B. By the time tubes 72A, 72B, and at least the lower portion of tubes 62, are full of water, water will start to discharge from nozzles 74 to water peat moss M.

Hence, the plants P in the present greenhouse 20 will be watered at least twice a day, at sunrise and sunset, in automatic gravity-fed fashion, without requiring any pumping mechanism. Also, in the event of a rainfall, rainwater will be collected by the collecting well 30 and distributed to plants P via tubes 62 and 72-74, in the same fashion. An advantage of the invention is that, since well 30 is well above ground level, exterior sand will generally not be able to clog bores 64 and, eventually, nozzles 74, whereby maintenance thereof is reduced to the minimum.

The greenhouse 20 is specifically designed for use in desertic areas. During daytime, the high heat generated by the sunrays should not substantially increase the internal temperature of the greenhouse, since the main body thereof, or shell 22, is opaque and the constituting material does have some thermally-insulating properties; the windows 6 represent only a small fraction of the total area of the greenhouse, through which the sunrays may pass, for permitting photosynthesis by the plants P. It would accordingly be advantageous that shell 22 be of a pale or even white tone, to reduce to the minimum the detrimental effects of overexposure to the sun. Similarly, during the night, which is known to be very cold in the desert comparatively to daytime temperatures, the fiberglass shell 22 will retain heat within the greenhouse, and heat losses through the window panes 56 will be limited to the minimum again because of the relatively low surface thereof in proportion to the whole greenhouse surface.

Should the temperature in the greenhouse 20 exceed an upper threshold level, the wing bolts 58 may be unscrewed to remove at least two windows 6A, whereby air ventilation is induced in order to decrease overall internal temperature. In any event, air circulation at regular daily or so intervals into the greenhouse is necessary for obvious reasons, independent of temperature variations. Again, windows 6A can be removed for that purpose; a preferred time for such operation could be slightly after morning or night dew, when the plants P have been watered by the watering means of the invention (62-76) and when outside temperature is at a moderate level.

Glassfiber-reinforced resin is preferred for shell 22 and well panel 30, because of its qualities; virtually infinitely resistant to water corrosion, lightweight, sturdy but having some flexibility in both stretching and contraction. It is envisioned that film sheets 57 be applied to window panes 56 to filter ultra-violet and infrared rays out of light entering the greenhouse. The peat moss M could be any other nutrient-based substrate, including compost and leaf-mould.

An operative greenhouse 20 having the following measurements was successfully assembled: 4¼ meters high, 9¾ meters of diameter, with a well 30 having a 3½ meters overall diameter and its flooring 32 having a 2¾ meters diameter; the load of rocks R supported in well 30 being one metric ton; the door 42 measuring about 1 meter by 2¼ meters; there being 16 sectors of shell 22; one removable (ventilation) window 6A being provided for each shell sector; each well bore 64 being about 5 centimeters in diameter; each window pane 56 measuring about 10 centimeters in diameter.

Alternately, vertical tubes 62 could be made of a metallic alloy. Metal tubes 62 would contribute to the reinforcement of well 30, which supports up to one ton of rocks, and is accordingly submitted to a very heavy load which could break the top portion of shell 22 without such reinforcement.

What I claim is:

1. In a greenhouse for growing plants, a dome-shaped rigid opaque shell (22), a plurality of windows mounted into apertures in said shell, and each defining a transparent pane an opening at the apex of the dome shell a rigid container closing said opening and fixedly secured to said shell, said container defining a flooring (32) and an upwardly-inclined circular side wall, said container including load of impervious rocks; a shell door attached to said shell for access to said greenhouse; collecting means to recuperate condensate water on said rocks from morning and evening dews; and distribution means for watering said plants with the water recuperated from the dew by said collecting means.

2. A greenhouse as in claim 1, wherein said container flooring is concavo-convex, with the convex side at the exterior, said container side wall having a number of bores along its bottom end portion; said collecting means (62-65) including hollow tubes, each one tube opening into a selected one of said bores and running down to the ground amongst the plants.

3. A greenhouse as in claim 2, wherein said container is dish-shaped, defining a peripheral rim fixedly secured to the exterior face of said shell said container side wall being upwardly, outwardly inclined, so that said container be funnel-shaped to further facilitate recuperation of rainwater.

4. A greenhouse as in claim 1, wherein said shell (22) consists of a number of successive sector panels, each sector panel defining inturned flanges at their opposite vertical side edges, said flanges of adjacent pairs of sector panels fixedly interconnected.

5. A greenhouse as in claim 4, further including release means to remove a window from the shell for thermal control and air circulation in the greenhouse there being at least one window per said sector panel, which is equipped with said release means.

6. A greenhouse as in claim 5, further comprising sealing members mounted about said windows and in between said sector panel flanges to prevent escape of moisture from the greenhouse when the windows are all closed.

7. A greenhouse as in claim 4, wherein the thickness of each said sector panel is about thrice that of each window pane.

8. A greenhouse as in claim 1, wherein said shell and said container are made of glassfiber-reinforced resin.

9. A greenhouse as in claim 1, wherein the ratio of diameters of said container to said greenhouse is about 1:3.

10. A greenhouse as in claim 3, further including a number of partition walls radially extending on the exterior convex face of said container flooring spacedly one from the other to define therebetween rock-receiving compartments.

11. A greenhouse as in claim 10, wherein the top edge of each of said partition walls is straight, connects to one portion of said peripheral rim but each partition wall (41) extends short of the center of said dish-shaped container to further define a central rock-receiving compartment.

12. A greenhouse as in claim 1, wherein said transparent window panes are made of plastic material.

13. A greenhouse as in claim 2, wherein said distribution means includes an array of generally horizontal hollow flexible tubes, each one end of each one of which sealingly connected to a corresponding first-mentioned vertical tube via an elbow coupler a plurality of upright nozzles operatively connected to said horizontal tubes at spaced intervals; said nozzles located amongst said plants and adapted for automatically dispensing water under hydrostatic pressure generated by said collecting means.

14. A greenhouse as in claim 13, wherein said collecting means tubes and said distribution means tubes are diametrally substantially identical.

15. A greenhouse as in claim 13, wherein the ratio of diameters of one nozzle to one horizontal tube is about 1:3.

16. A greenhouse as in claim 13, wherein said horizontal tubes extend at right angles to and intersect one another.

17. A greenhouse as in claim 16, wherein at least some of said intersecting horizontal tubes communicate at their intersection.

18. A greenhouse as in claim 16, wherein said horizontal tubes are slightly downwardly inclined toward the center of said greenhouse.

19. A greenhouse as in claim 4, wherein each shell sector panel includes an inturned flange fixedly secured at its bottom edge (22B), the latter being below ground level; further including anchoring members each anchoring member anchoring one said sector panel bottom inturned flange to the ground.

20. A greenhouse as in claim 1, wherein each said window is circular.

21. A greenhouse as in claim 20, wherein the ratio of diameters of each said circular window to said shell is about 1:35.

22. A greenhouse as in claim 20, wherein the ratio of the diameter of each said circular window to the height of said shell is about 1:43.

23. A greenhouse as in claim 1, with each said window pane further provided with a film for filtering ultra-violet and infra-red rays.

24. A greenhouse as in claim 2, wherein the radius of curvature of the concavo-convex flooring of said apex container (30) is slightly greater than that of said shell.

25. A greenhouse as in claim 1, wherein said shell has an exterior light-reflecting colour.

* * * * *